United States Patent
Hudrick (12)

(10) Patent No.: US 6,536,666 B1
(45) Date of Patent: Mar. 25, 2003

(54) TECHNIQUES FOR INTERFACING A BAR CODE SCANNER TO A PC USING A MESSAGE-BASED AND/OR CHARACTER-BASED KEYBOARD INHIBIT

(75) Inventor: Donald T. Hudrick, Sicklerville, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 09/616,776

(22) Filed: Jul. 14, 2000

Related U.S. Application Data

(60) Provisional application No. 60/144,389, filed on Jul. 16, 1999.

(51) Int. Cl.[7] ............................................. G06K 7/10
(52) U.S. Cl. .................................................. 235/462.15
(58) Field of Search ..................................... 235/462.15

(56) References Cited

U.S. PATENT DOCUMENTS

| | | | | |
|---|---|---|---|---|
| 5,021,640 A | * | 6/1991 | Muroi ........................... | 186/61 |
| 5,178,234 A | | 1/1993 | Sakurai et al. | |
| 5,848,292 A | * | 12/1998 | Nathan ........................... | 710/2 |
| 5,854,945 A | * | 12/1998 | Criscito et al. .............. | 235/435 |
| 5,875,415 A | | 2/1999 | Lieb et al. | |
| 6,263,383 B1 | * | 7/2001 | Lee et al. .................... | 709/218 |
| 6,312,175 B1 | * | 11/2001 | Lum ........................... | 400/472 |

FOREIGN PATENT DOCUMENTS

| | | | |
|---|---|---|---|
| JP | 8-328717 | * | 12/1996 |

OTHER PUBLICATIONS

Copyright 1996 Information Access Company; Automatic I.D. News; Sep., 1996; p. 18; ISSN: 0890–9768.

Copyright 1996 Information Access Company; Packaging Digest; May, 1996; vol. 33; No. 6; p. 34; ISSN: 0030–9117.

MS900 by Metrologic Instruments, Inc.; Sep. 1998; www.metrologic.com.

* cited by examiner

*Primary Examiner*—Mark Tremblay
(74) *Attorney, Agent, or Firm*—Morgan, Lewis & Bockius, LLP

(57) ABSTRACT

The intermingling of bar code data and typed-in data in a keyboard-wedge configuration is prevented through the use of a message-based keyboard inhibit procedure implemented by the bar code scanner. In this manner, both the typed-in data and the bar code data will remain uncorrupted, even if the keyboard data is being entered substantially simultaneously with the scanning and/or decoding of bar code data. This message-based keyboard inhibit procedure tests for any communication in progress between the keyboard and PC. If no communication is in progress, the bar code scanner places a switching mechanism into a first state so as to disable communications between the keyboard and a keyboard controller port of a PC (personal computer), thereby inhibiting the keyboard. The bar code scanner then transmits the decoded bar code to the PC as a sequence of data bytes. The bar code scanner also implements any communications that are required between the PC and the keyboard during this time. The inhibit will not be released until all characters of the bar code have been transmitted by the scanner. Once all characters of the bar code are transmitted, the bar code scanner releases the inhibit by placing the switching mechanism into a second state, so as to permit communications to take place between the keyboard and the PC. Any keyboard key that was typed in during transmission of the bar code will now be transmitted from the keyboard to the PC.

20 Claims, 16 Drawing Sheets

TECHNIQUES FOR INTERFACING A BAR CODE SCANNER TO A PC USING A MESSAGE-BASED AND/OR CHARACTER-BASED KEYBOARD INHIBIT

The present patent application is based upon Provisional Application Serial No. 60/144,389, filed on Jul. 16$^{th}$, 1999, and entitled, "Techniques for Interfacing a Bar Code Scanner to a PC Using A Message-Based and/or Character-Based Keyboard Inhibit", the disclosure of which is incorporated herein by reference.

FIELD OF THE INVENTION

To The invention relates generally to bar code scanners, and more specifically, to techniques for interfacing bar code scanners with computers.

BACKGROUND OF THE INVENTION

For years, various bar code scanner manufacturers have been selling keyboard-wedge bar code scanners. With reference to FIG. 1, bar code scanner 108 is connected to a personal computer (PC) 100 keyboard controller port 104 and a computer keyboard 110 in an Y or wedge type configuration. Bar code scanner 108 may contain an on-board processor 109. PC 100 also contains a processor 101. The Y or wedge type configuration is implemented using interconnection cable 106. A first section of interconnection cable connects keyboard controller port 104 to bar code scanner 108, and a second section of interconnection cable connects bar code scanner 108 to computer keyboard 110.

From a conceptual standpoint, imagine that a digital switch 105 (within bar code scanner 108) is set up to selectively connect and disconnect the first section of interconnection cable 106 to the second section of interconnection cable 106. When the digital switch 105 is in a closed state, the keyboard controller port 104 is connected to bar code scanner 108 and computer keyboard 110 via the first and second sections of interconnection cable 106. When the digital switch 105 is in an open state, the keyboard controller port 104 is only connected to the bar code scanner 108, and the keyboard 110 is isolated from the bar code scanner 108 as well as the keyboard controller port 104.

When digital switch 105 is in the closed state, computer keyboard 110 and bar code scanner 108 are placed in parallel across controller port 104. This parallel configuration is used because keyboard controller 102 circuitry within presently-existing PCs (personal computers) 100 and laptop computers attempts to detect the existence of a computer keyboard 110 connected to the keyboard controller port 104. The controller port 104 needs to be connected to a computer keyboard 110, even if the keyboard is not to be used for subsequent data entry, and even if the controller port 104 is also connected to an input device other than a computer keyboard. If the keyboard controller 102 circuitry does not detect a keyboard connected to the controller port 104, the PC 100 and/or laptop may then disable the port, preventing any further inputting of data. In the operational environment of FIG. 1, this disablement poses a problem, because we desire to input further data as bar codes are detected and decoded.

In actuality, the use of a digital switch 105 to completely isolate the keyboard from the keyboard controller port is an over-simplification, presented for purposes of conceptual expediency. Real-world systems may isolate the keyboard using any of a variety of techniques. However, a common approach is to bring the keyboard clock line to a logic "low" state, while allowing the keyboard data line to float "high". In practice, connections between the LED status indicator lamps (num-lock, caps-lock, and scroll-lock) and the keyboard controller port may remain in place, even while the keyboard is inhibited.

With the increasing use of laptop computers and keyless data entry, the keyboard controller port shows great potential as a convenient, somewhat standardized, and readily available data input channel. However, this potential could be advantageously exploited only if it were possible to find some way around the necessity of connecting this port to an actual computer keyboard. By way of clarification, there are a number of existing programs that do not require the use of a computer keyboard per se, but these programs have neglected to provide mechanisms by which a computer keyboard is emulated, so as to prevent the controller port from being disabled.

Assume that a conventional keyboard wedge bar code scanner is connected to a keyboard controller port of a PC or laptop, as shown in FIG. 1, while, at the same time, the keyboard that is connected in the parallel (Y) configuration is eliminated. Will the hardware configuration of FIG. 1 still function as desired? It is important to realize that keyboard-to-PC communications is implemented by means of a 2-way channel. Other types of data must be communicated between the PC and the keyboard in addition to information specifying the key or keys that were pressed. When a PC is powered up, the PC is programmed to check for the existence of a primary data input device, which is typically a keyboard. The PC begins a data exchange with the keyboard, and this communication is called "power-on diagnostics". If the keyboard is not present, or if the power-on diagnostics fail, the PC will not boot up. Accordingly, if a normal boot-up is desired, the keyboard shown in FIG. 1 should not be eliminated. In the case of laptop computers, a similar situation exists. A communication protocol is used to sense the presence of an external keyboard that is connected to the laptop's external keyboard port. If the laptop computer fails to detect a keyboard at the external keyboard port, then the laptop computer may disable its external keyboard port.

Even if a technique were to be developed by which a bar code scanner could successfully emulate a computer keyboard during boot-up, another problem would then arise. Eleven (11)-bit transmission protocols are utilized almost universally to provide keyboard to PC data transfer. The transmission protocol begins with a Start bit (low), followed by 8 data bits (these bits represent a scan code which, in turn, could be used to represent a portion of a detected bar code or a key press), a Parity bit (odd parity) and finally a Stop bit (high). Three of these 11-bit "bytes" are used to represent a "character". Problems arise because this protocol allows the PC (or laptop) to interrupt the transmitted sequence up through the 9$^{th}$ bit.

If the keyboard 110 or keyboard wedge scanner (i.e., bar code scanner 108) begins transmitting a data byte, the PC can prevent the successful communication of that byte, up to and including the 9$^{th}$ th transmitted bit. To make matters worse, a typical bar code includes a sequence of several 3-byte characters. An interruption at any time during transmission of that sequence will result in loss or corruption of the entire bar code. This keyboard inhibit problem is described in greater detail in a reference book entitled, "PC KEYBOARD DESIGN", by J. Konzak, and published by Annabook.

With the advent of multitasking operating systems, sophisticated network operating systems, and dual-keyboard port laptops and PC's, the problem worsens. Some of these operating systems interrupt keyboard port communications on a frequent and periodic basis, such as once every ten milliseconds. Of course, in operational environments where the keyboard controller port is not used with an auxiliary input devices, the computer keyboard will sense this stoppage of communications and retransmit the scan code after the PC releases its halt or inhibit of the keyboard. Existing bar code scanners are not so equipped. If a data transmission from a bar code scanner is interrupted, the scanner has no mechanism by which to ascertain whether or not a data entry error has occurred.

Existing scanners do not monitor for the existence of an inhibit signal, so the scanner cannot infer a data entry error based upon the existence of an inhibit. Pursuant to prior art techniques, bar code scanners had not monitored the inhibit signal because the decoded bar codes were wedged into the transmitted data for brief periods of time, relative to typed-in keyboard data. Also, as a practical matter, the keyboard BIOS virtually never inhibits the keyboard during scan code transmission. Any problems that may have been encountered were handled by changing certain programmable parameters such as inter-character delays or inter-scan-code delays.

In some existing wedge scanner systems, PC 100 maintains control over keyboard control port communications. After all, the PC is equipped to inhibit keyboard transmission at any time by sending out a "keyboard inhibit" signal. However, a bar code scanner 108 could also be programmed to inhibit the keyboard, and some presently-existing bar code scanners are programmed take advantage of this fact.

Various keyboard wedge bar code scanners 108 have been programmed to transmit decoded bar code data on a character-by-character basis. This approach operates as follows: Test for active communications between the keyboard 110 and the PC 100. If no communication is detected, the bar code scanner 108 opens digital switch 105, thereby inhibiting the keyboard 110. The bar code scanner 108 then transmits a character, which, using standard protocols, includes three data bytes. If the bar code scanner 108 detects communications between the keyboard 110 and the PC 100, the bar code scanner 108 waits until such communications are completed before inhibiting the keyboard 110 and transmitting the character. After transmission of the character, the bar code scanner 108 releases the inhibit. Then, the aforementioned cycle begins again until all decoded characters have been transmitted by the bar code scanner 108.

This character-by-character inhibit was developed to allow for any additional communications that might be required between keyboard 110 and PC 100. Certain country-specific keyboards as, for example, those utilized throughout Germany, require that status information for one or more keyboard LED indicators be sent from the PC 100 to the keyboard 110, when the <shift> key is pressed. These keyboard LED indicators are also present on conventional keyboards used throughout the United States, and are used to indicate the status of the Num-Lock (numeric lock), Caps-Lock (capital lock), and Scroll-Lock keys. Illumination of an LED indicates that the corresponding "lock" function is active and operational for subsequent key presses, whereas non-illumination of an LED indicates that the corresponding function is inactive and not operational for subsequent key presses. The status of these LED indicators is tracked by the PC 100 and, therefore, the PC needs to communicate with the keyboard 110 so that the appropriate LED indicators will be illuminated or de-illuminated.

In operational environments where US-type keyboards are used, the character-by-character method allows for proper activation and deactivation of the LED indicators on the keyboard. For example, the caps-lock indicator will toggle properly. However, on many European keyboards, the caps-lock key functions differently than on U.S. keyboards. Pressing caps-lock a first time results in implementation of the caps-lock function on subsequent key presses. However, pressing caps-lock a second time implements a shifting function, instead of turning the caps-lock function off, as would be the case for a U.S. keyboard. The PC must accurately keep track of the number of times that the caps-lock key has been hit in order to provide proper drive signals to the keyboard LED indicators. However, if communications between the keyboard and the PC are subject to interruption, the PC may not be able to acquire accurate information about the correct operational status of the caps-lock, num-lock, and scroll-lock keys. Moreover, the PC may interpret received bar code characters as keyboard key presses, and attempt to update LED status information based upon one or more characters of a received bar code. If the character-by-character method is used in conjunction with a European keyboard, the PC may not acquire the necessary status information from the keyboard, or the PC may acquire superfluous information from scanned bar code symbols. The PC will send erroneous LED drive signals to the keyboard, causing inappropriate LEDs to be illuminated, and/or causing LEDs that should be illuminated to remain dark. Accordingly, every time that the bar code scanner sends a bar code to the keyboard controller port, it is then necessary to update the status of the LED indicators, or the indicators will not display accurate information.

Although the character-by-character method is useful in certain specific system applications, what would happen if keyboard 110 keys were being pressed at the same time that data was being scanned by the bar code scanner 108? Bar code data and typed-in data would be intermingled, thereby corrupting both sets of data.

SUMMARY OF THE INVENTION

The intermingling of bar code data and typed-in data in a keyboard-wedge configuration is prevented through the use of a message-based keyboard inhibit procedure implemented by the bar code scanner. In this manner, both the typed-in data and the bar code data will remain uncorrupted, even if the keyboard data is being entered substantially simultaneously with the scanning and/or decoding of bar code data. This message-based keyboard inhibit procedure tests for any communication in progress between the keyboard and PC. If no communication is in progress, the bar code scanner places a switching mechanism into a first state so as to disable communications between the keyboard and a keyboard controller port of a PC (personal computer), thereby inhibiting the keyboard. The bar code scanner then transmits the decoded bar code to the PC as a sequence of data bytes. The bar code scanner also implements all communications that are required between the PC and the keyboard during this time. The inhibit will not be released until all characters of the bar code have been transmitted by the scanner. Typically, three data bytes are used to represent each bar code character, and bar codes include a plurality of such characters. Once all characters of the bar code are transmitted, the bar code scanner releases the inhibit by placing the switching mechanism into a second state, so as to permit communications to take place between the keyboard and the PC. At this time, any keyboard key that was typed in during transmission of the bar code will now be transmitted from the keyboard to the PC. Presently-existing keyboards have built-in buffers, and, therefore, such typed-in data will not be lost.

Pursuant to a further embodiment of the invention, the first state of the switching mechanism inhibits the keyboard by placing a keyboard clock line into a logic "low" state, and allowing a keyboard data line to float to a logic "high" state. The second state of the switching mechanism permits communication between the keyboard and the PC by allowing logic "high" pulses on the keyboard clock line.

Message-based keyboard inhibit solves the problem of the keyboard and bar code scanner communicating on the same channel without interference. The invention can be provided by equipping the bar code scanner with software, firmware, and/or operating instructions. The user of the bar code scanner will be able to type-in data simultaneously with the scanner scanning and/or decoding bar code data. Both sets of data will remain intact throughout the typing and scanning interval.

Pursuant to a further embodiment of the invention, the bar code scanner is equipped with an automatic detection mechanism to keep track of the status of one or more keyboard LED indicators, including at least one of the Caps-lock, Num-lock, and Scroll-lock LED indicators. The automatic detection mechanism is optionally equipped to keep track of a scan code transmission protocol currently in use, such as make-Break, Make-Only, AT or PS2-type scan-code transmission protocols. The manner in which the aforementioned LED indicators react to key presses varies according to the country type of the keyboard.

DETAILED DESCRIPTION OF THE PREFERRED EMBODIMENTS

Figure 2:
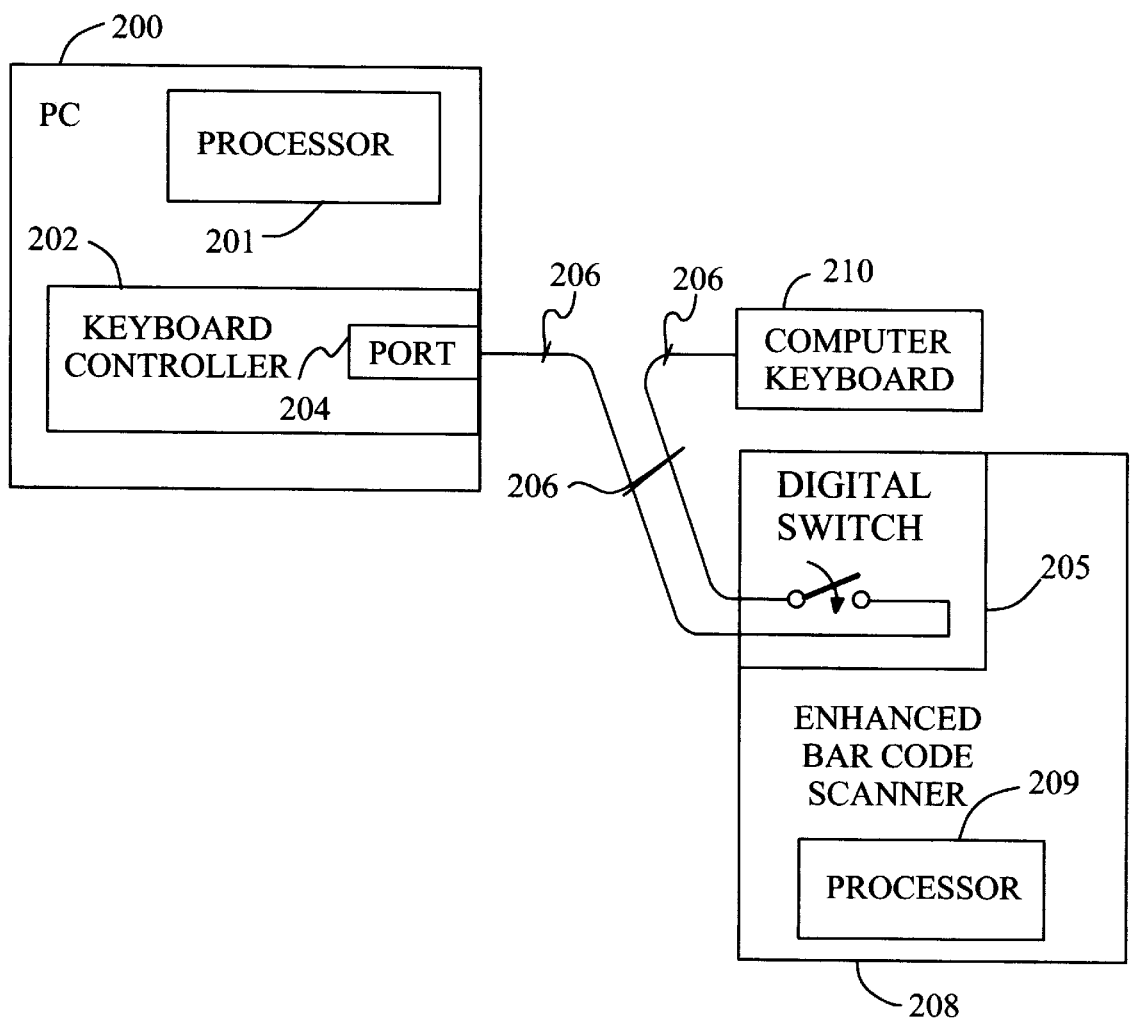
FIG. 2 is a hardware block diagram showing a keyboard wedge bar code scanner configuration embodying the techniques of the present invention.
Figure 3A:
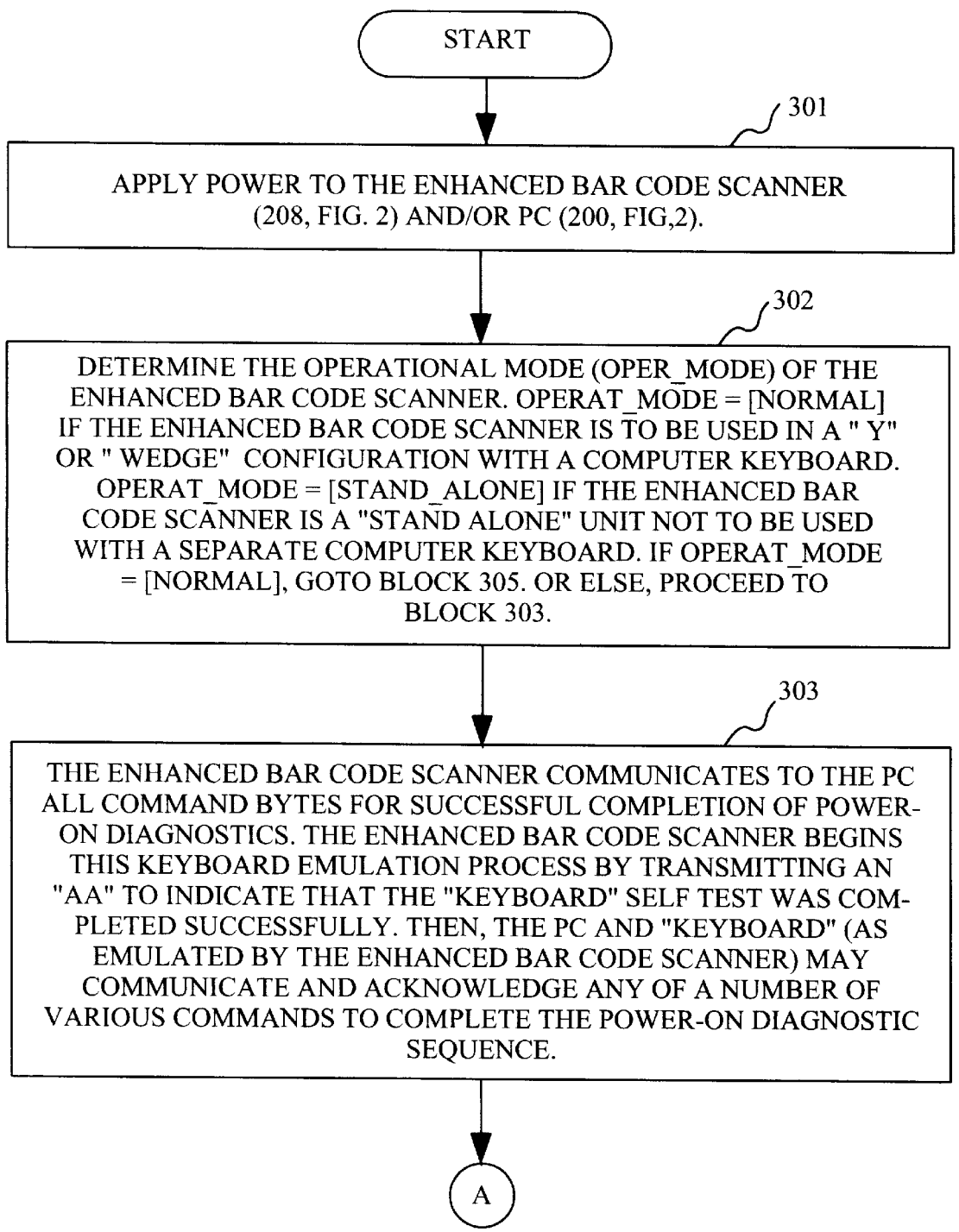
FIGS. 3A–3K together comprise a flowchart setting forth a message-based keyboard inhibit procedure implemented by a bar code scanner according to a preferred embodiment of the invention.
Figure 3B:
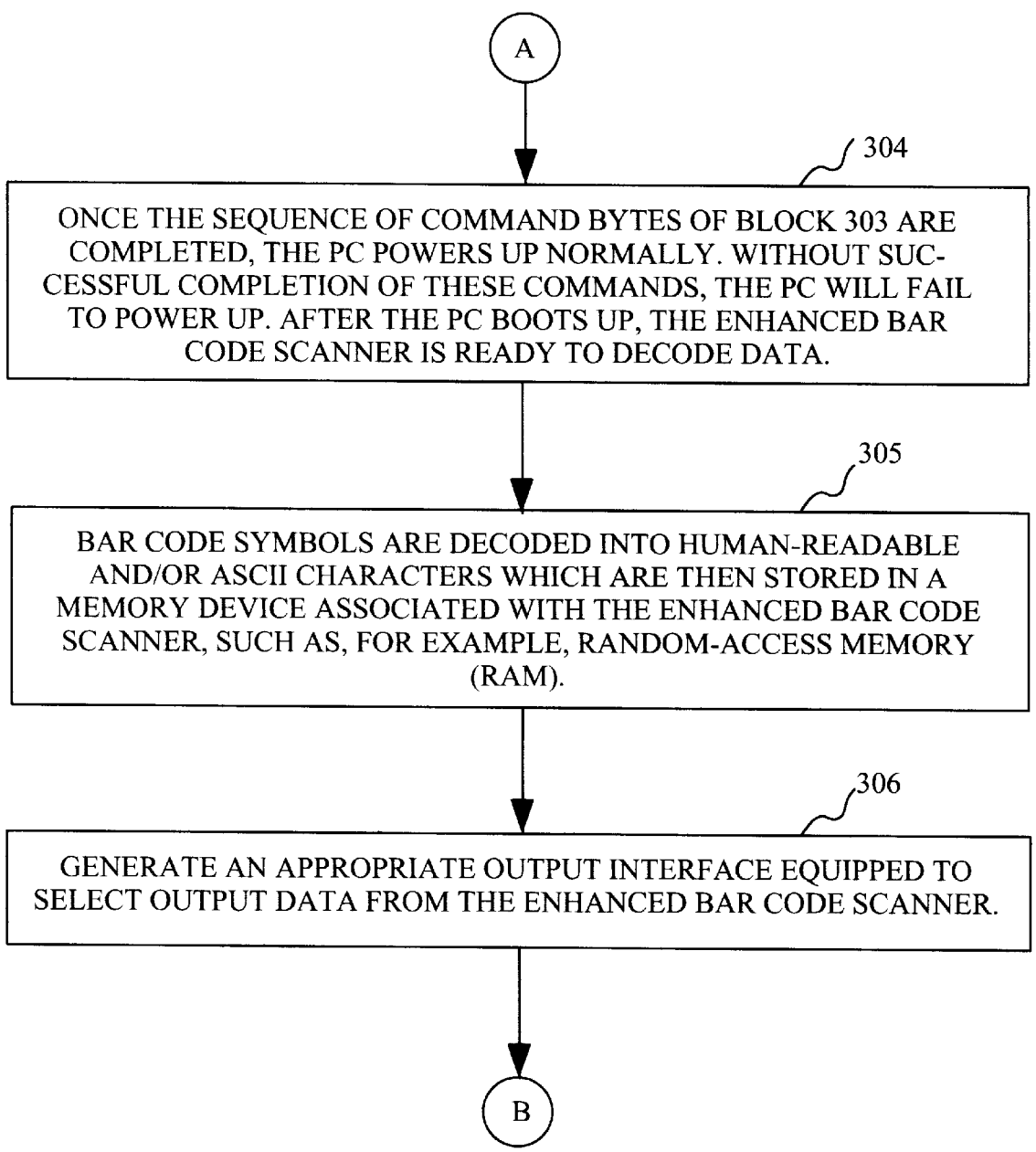
Figure 3C:
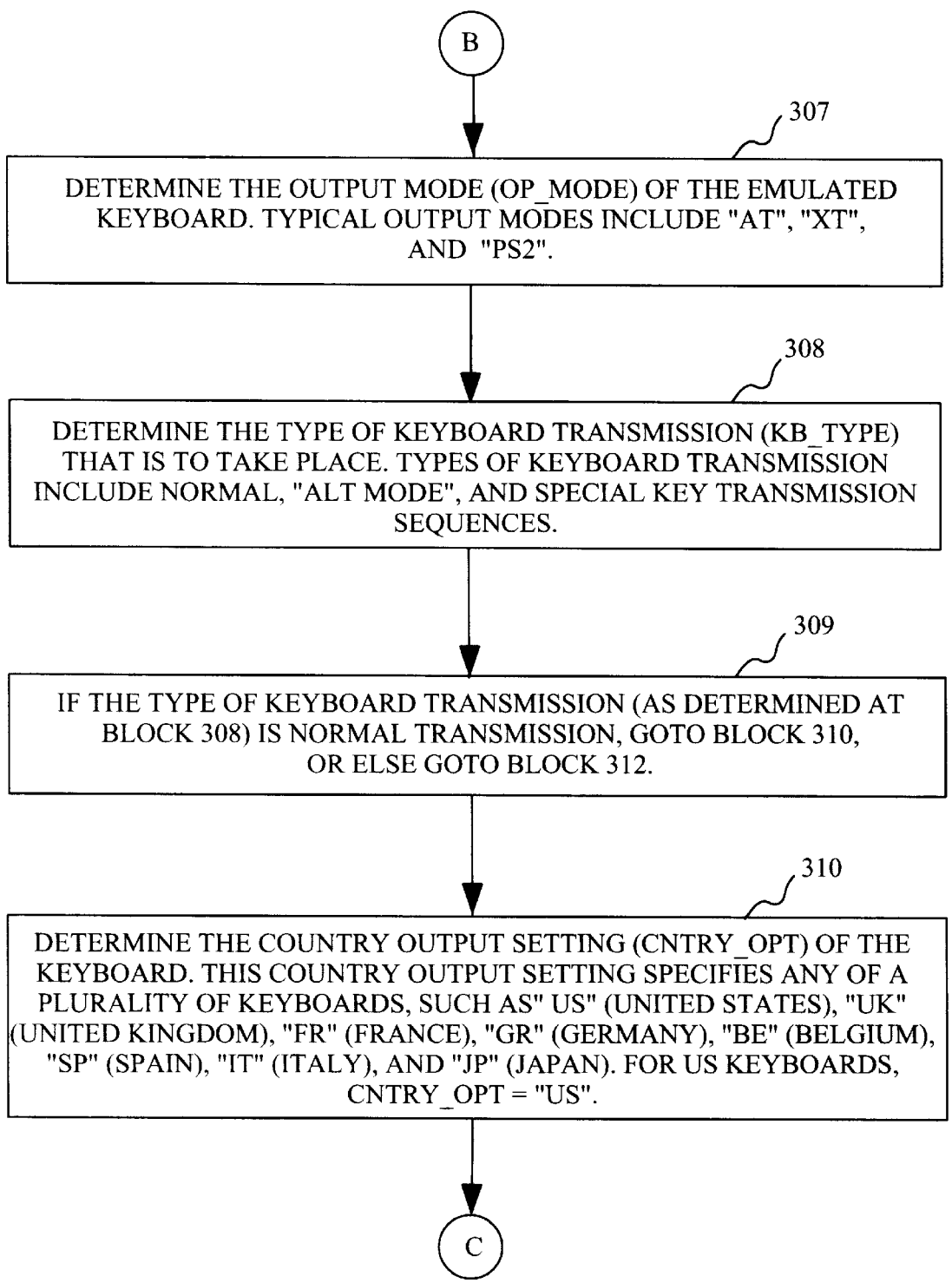
Figure 3D:
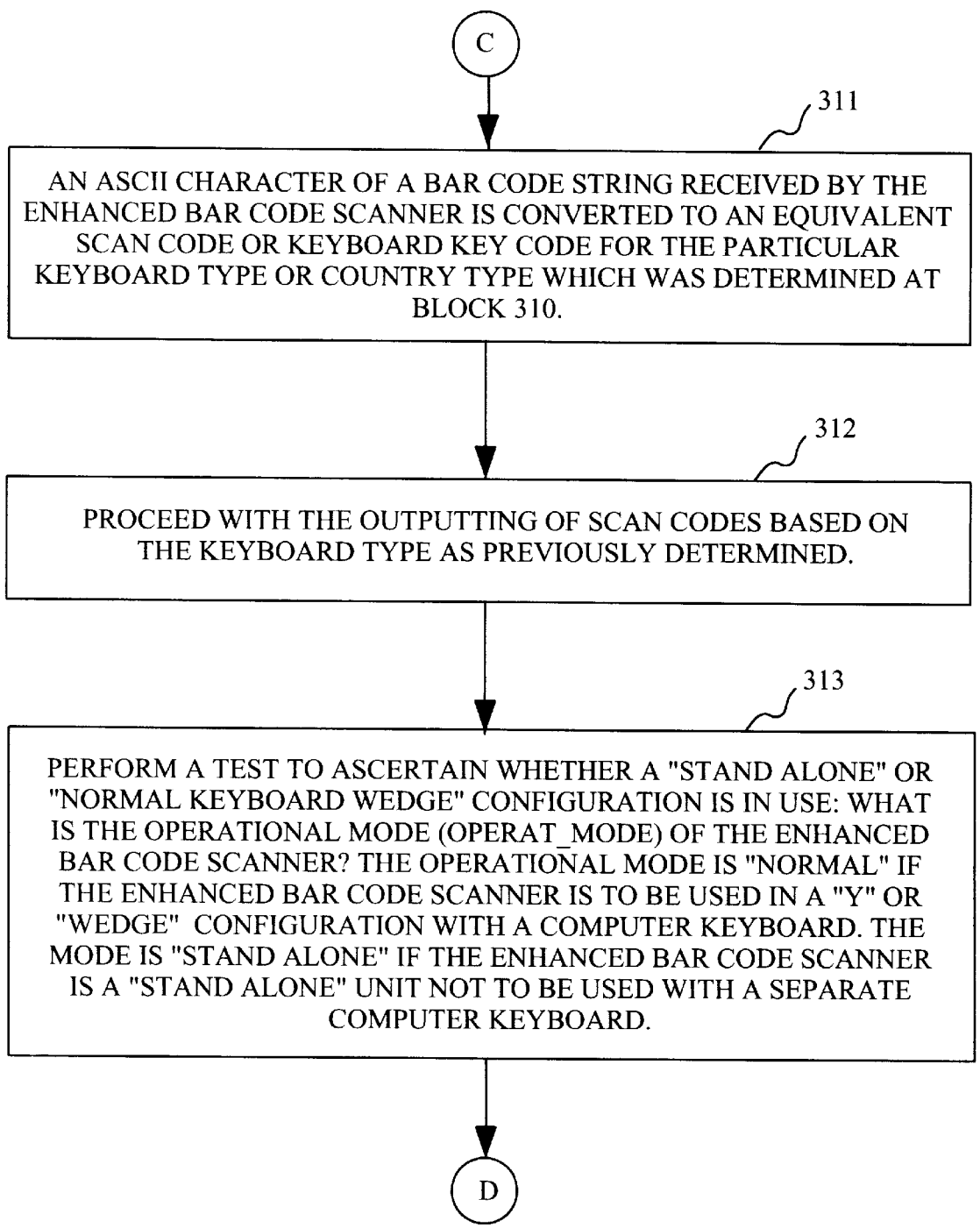
Figure 3E:
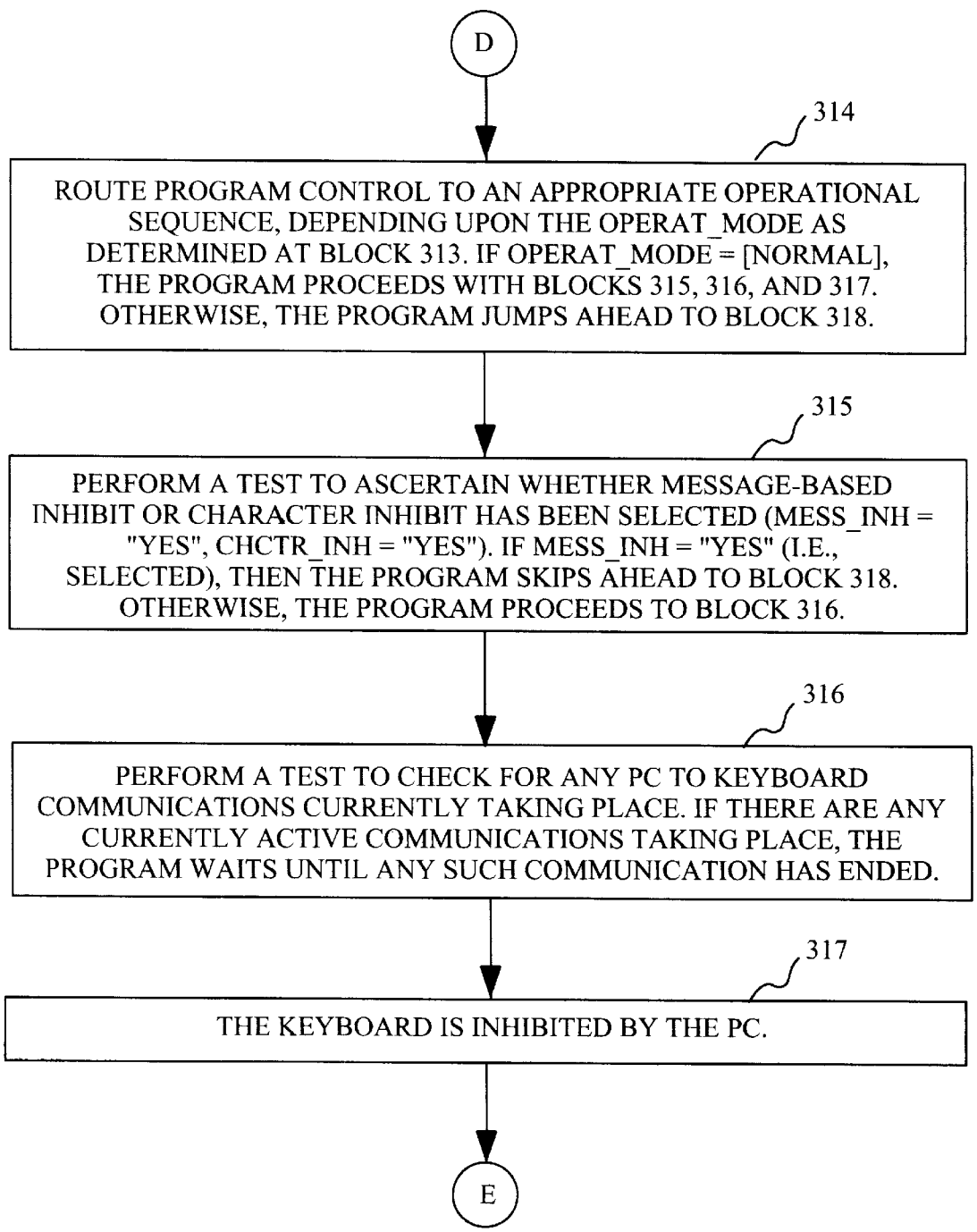
Figure 3F:
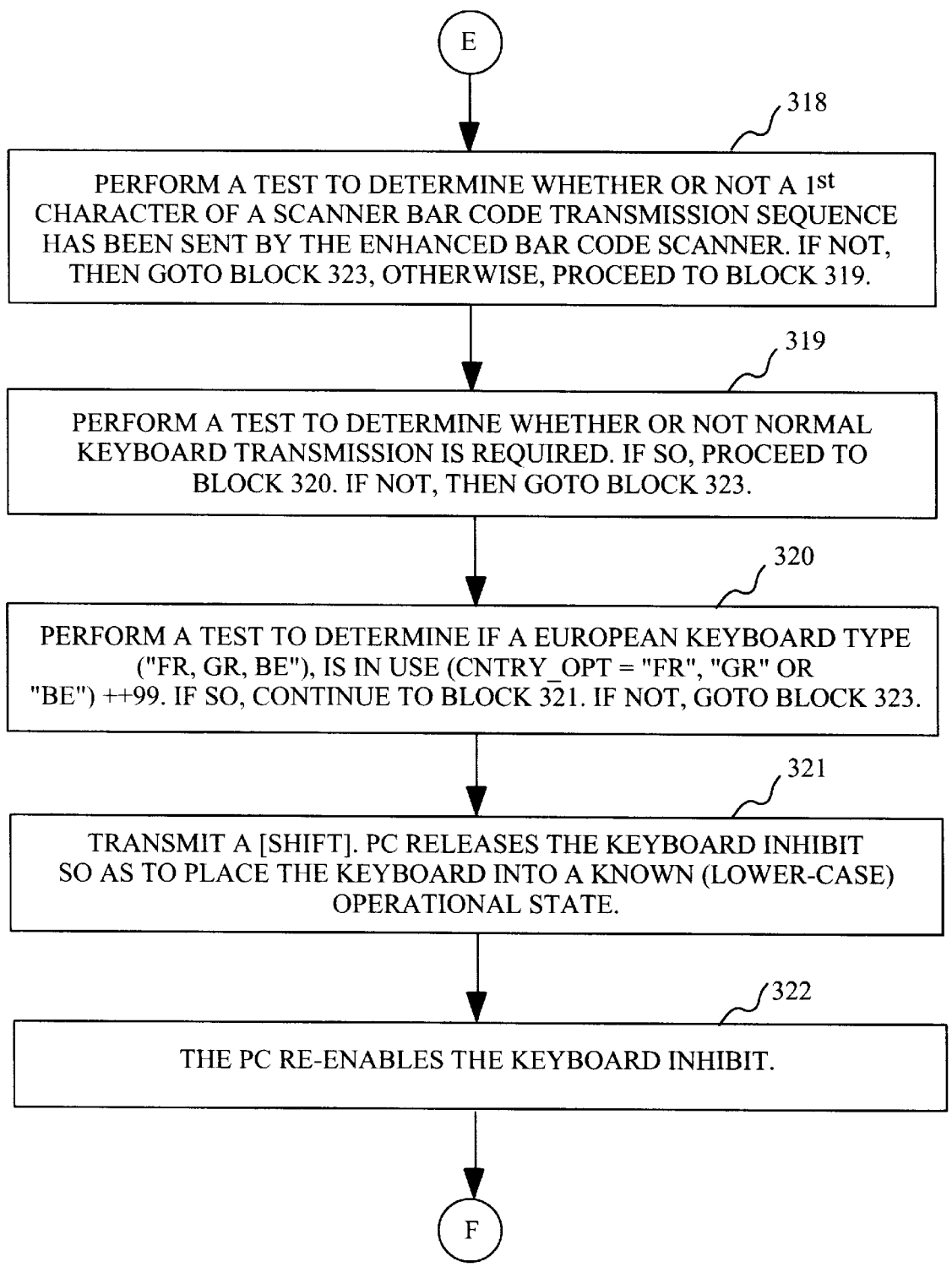
Figure 3G:
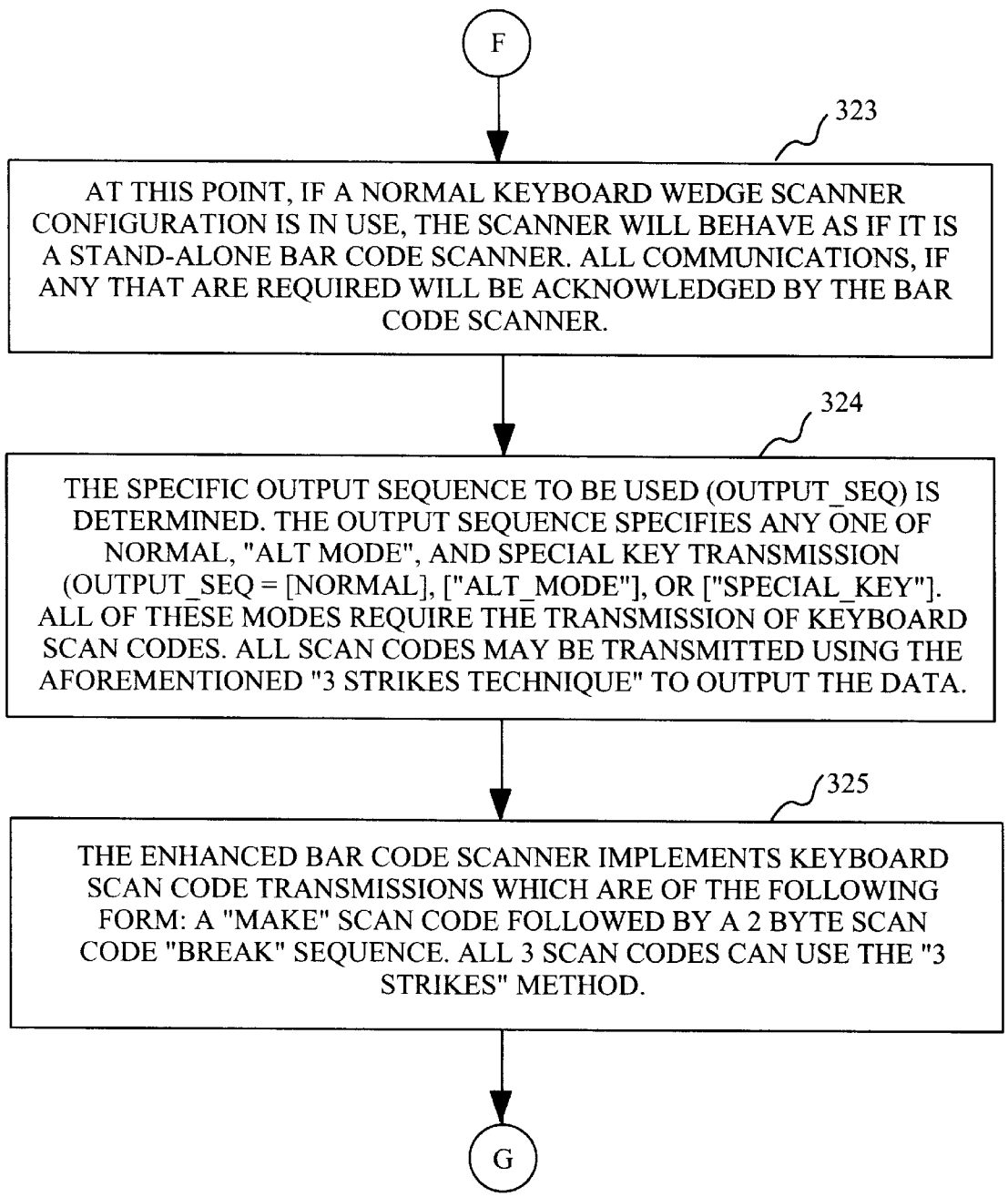
Figure 3H:
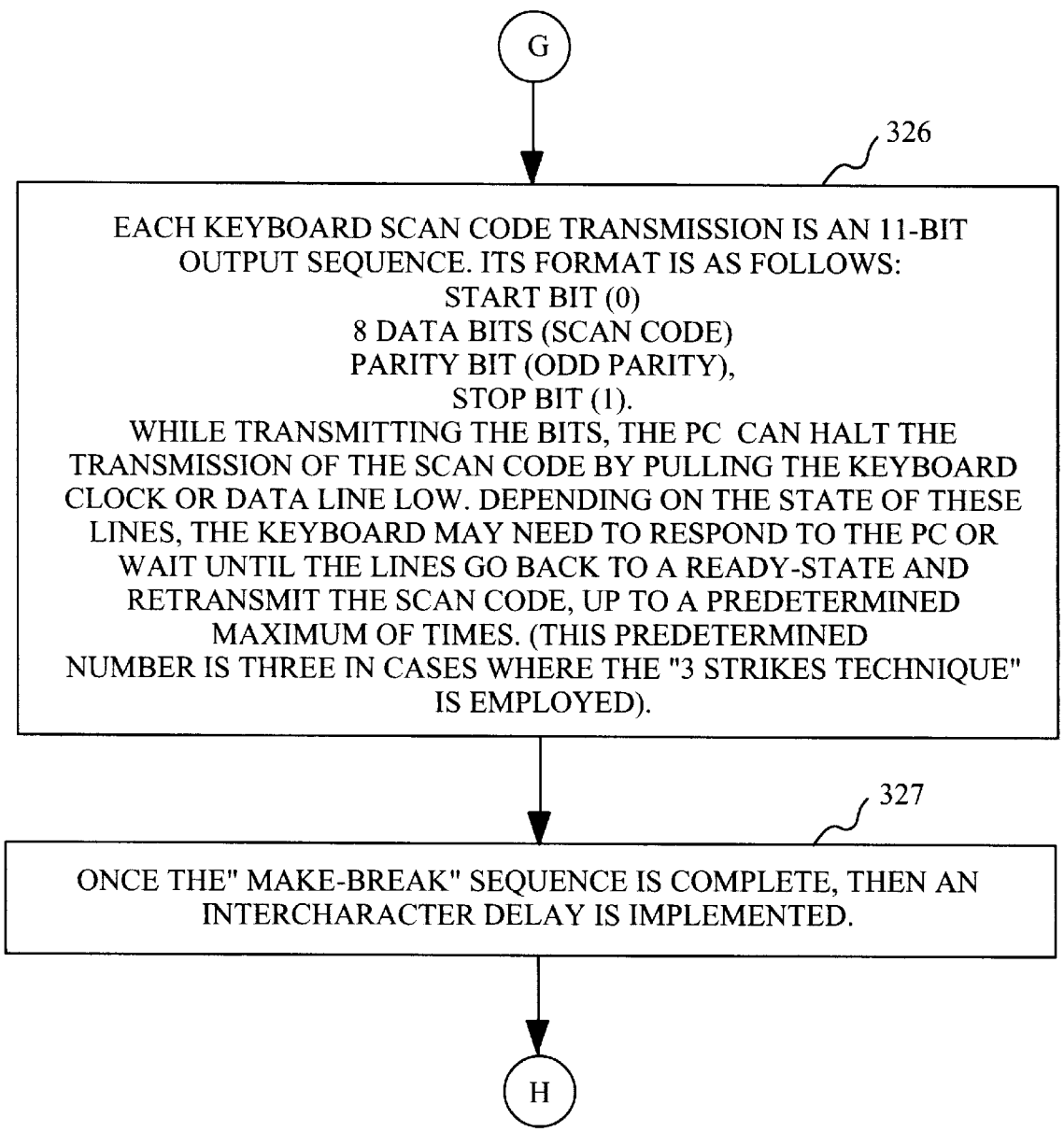
Figure 3I:
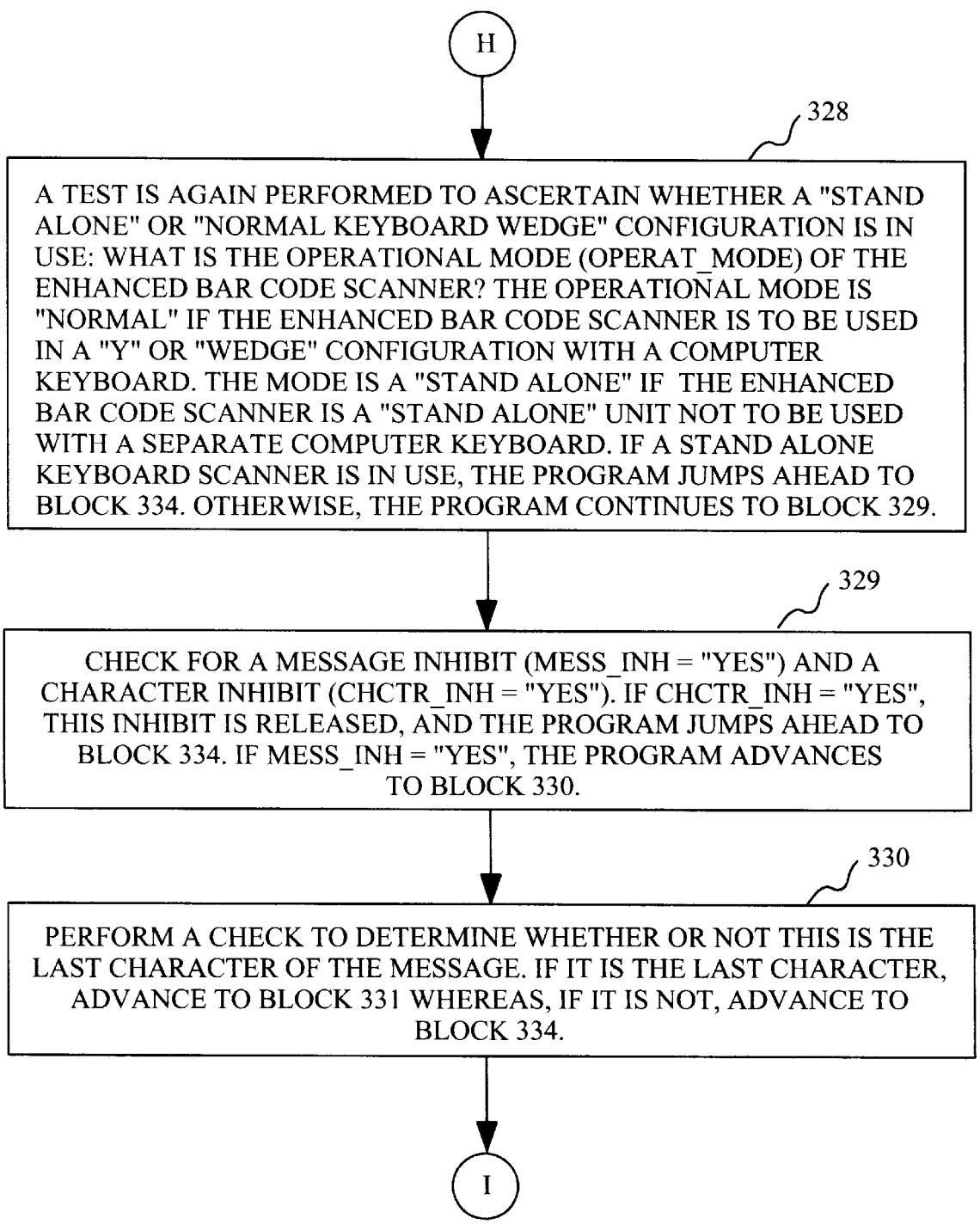
Figure 3J:
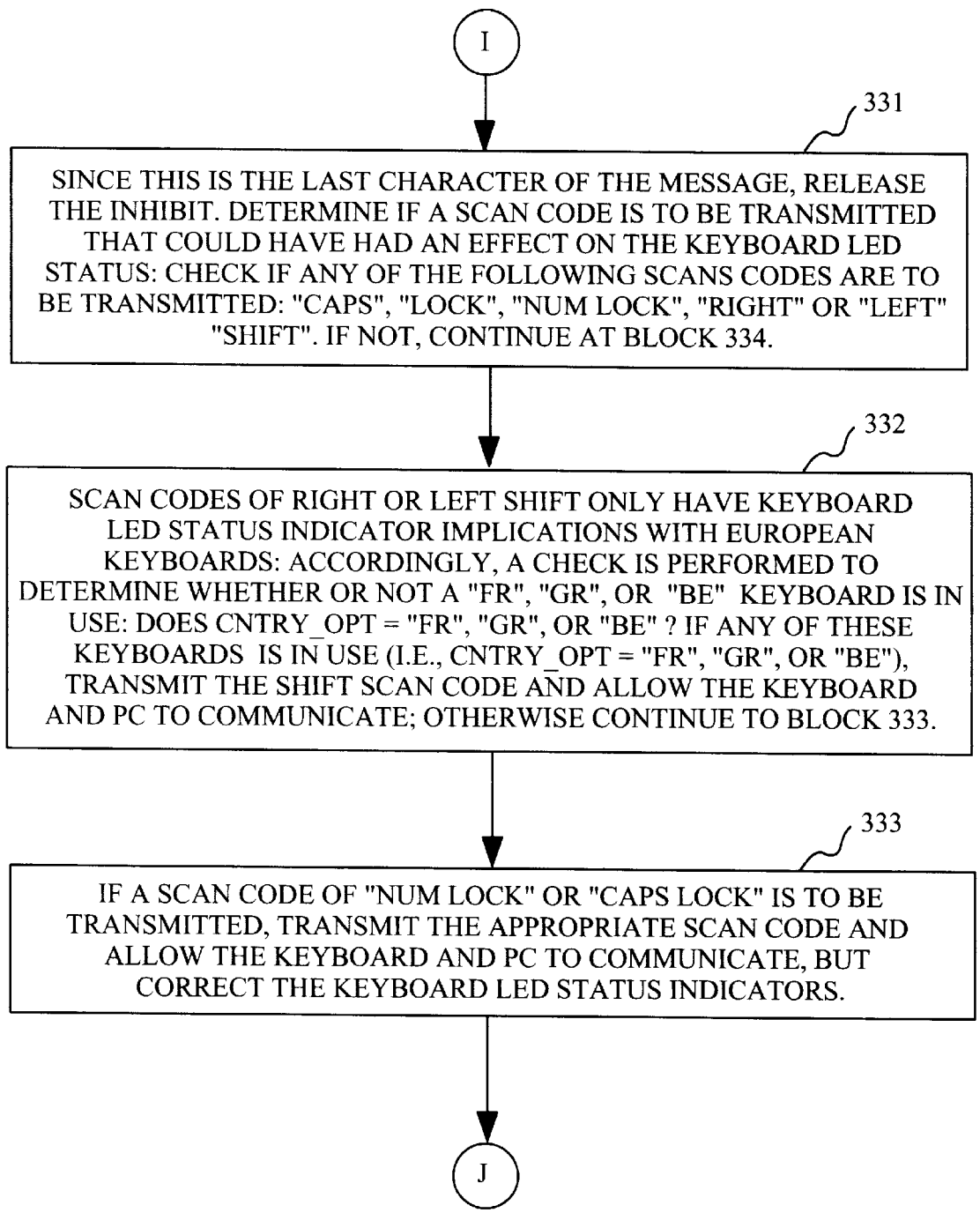
Figure 3K:
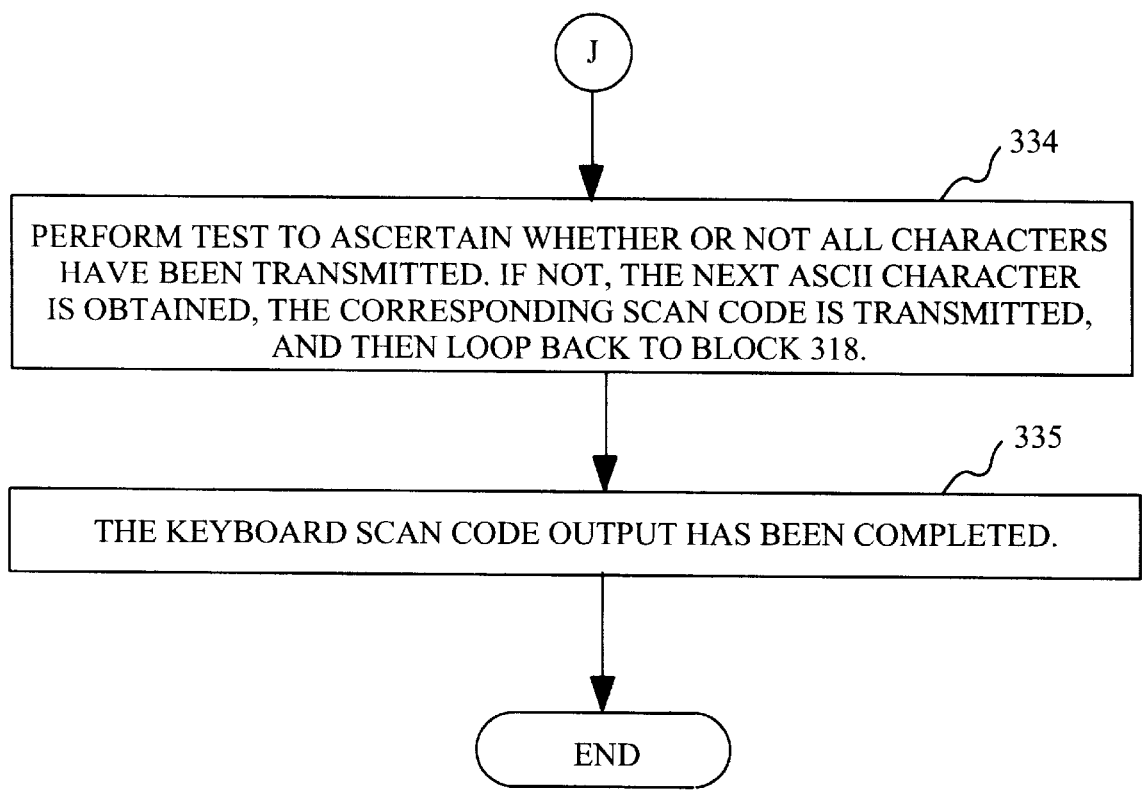

FIG. 2 is a hardware block diagram showing a keyboard wedge bar code scanner configuration embodying the techniques of the present invention. Enhanced bar code scanner 208 is connected to a keyboard controller port 204 of a personal computer 200 via interconnection cable 206. A first section of interconnection cable 206 connects keyboard controller port 204 to enhanced bar code scanner 208, and a second section of interconnection cable connects enhanced bar code scanner 208 to computer keyboard 210.

A digital switch 205, controlled by enhanced bar code scanner 208, is connected between the first and second sections of interconnection cable 206. This digital switch 205 is used to selectively inhibit keyboard 210. When the digital switch 205 is in a first state, the switch causes a keyboard clock line to remain in a logic "low" state, and allows a keyboard data line to float to a logic "high" state. In this state, the keyboard 210 is inhibited and cannot communicate with the keyboard controller port 204. However, the enhanced bar code scanner 208 can now communicate with the keyboard controller port 204 without interference from keyboard 210, even if keyboard keys are being pressed When the digital switch 205 is in a second state, the keyboard clock line is allowed to carry one or more clock pulses having a logic "high" state. In this manner, the keyboard 210 is enabled, and keyboard key presses will be transmitted to keyboard controller port 204.

The manner in which the enhanced bar code scanner 208 selectively inhibits the keyboard 210 is described for illustrative purposes, as a switching mechanism may be employed to inhibit keyboard 210 using a technique other than, or in addition to, holding the clock line low. The scope of the invention includes such techniques. For example, the digital switch 205 could be placed in series between keyboard 210 and PC 200. When in an open state, the switch 205 would cut off all communications between the keyboard 210 and the PC 200, whereas, in a closed state, the switch 205 would connect the keyboard to the PC 200.

Keyboard controller port 204 is driven by keyboard controller 202. Interconnection cable 206 is shown for illustrative purposes only, as any other technique for conveying information from one place to another may be used in lieu of, or in addition to, interconnection cable 206, as long as these communications are capable of being controlled by a switching mechanism that can selectively enable and disable the keyboard. These techniques may include wireless communication, wired communication, optical communication, and others. Accordingly, digital switch 205 is also shown for illustrative purposes, and another switching mechanism could be used in place of, or in addition to, digital switch 205, depending upon the manner in which communications are to be provided between keyboard controller port 204 and keyboard 210. Moreover, PC 200 is shown for illustrative purposes, as any of a variety of computing devices may be employed in lieu of, or in addition to, PC 200. In the example of FIG. 2, PC 200 includes a processor 201. Enhanced bar code scanner 208 may contain an on-board processor 209.

In the configuration of FIG. 2, a computer keyboard 210 is employed to illustrate the potential problems that could occur if someone attempted to transmit a decoded bar code from the enhanced bar code scanner to 208 to the keyboard controller port 204 at the same time that the keyboard 210 is being used. If digital switch 205 is in the aforementioned second state, bar code data can interfere with keyboard data. However, if digital switch 205 is in the aforementioned first state, the computer is unable to send LED status indication signals to the keyboard, and, moreover, data typed into the keyboard will not reach the keyboard controller port.

Enhanced bar code scanner 208 is "enhanced" in the sense that it is equipped to execute a procedure for controlling a switching mechanism such as, for example, digital switch 205, so as to selectively disable keyboard 210. The enhancement may be implemented using software, firmware, and/or operating instructions. Use of the term "enhanced" is not necessarily indicative of any hardware enhancements to the bar code scanner.

The enhanced bar code scanner 208 controls the switching mechanism so as to permit substantially simultaneous operation of computer keyboard 210 and enhanced bar code scanner 208. The intermingling of bar code data and typed-in data in the keyboard-wedge configuration of FIG. 2 is prevented through the use of a message-based keyboard inhibit procedure implemented by the enhanced bar code scanner 208. In this manner, both the typed-in data and the bar code data will remain uncorrupted, even if the keyboard data is being entered substantially simultaneously with the scanning and/or decoding of bar code data.

Figure 4A:
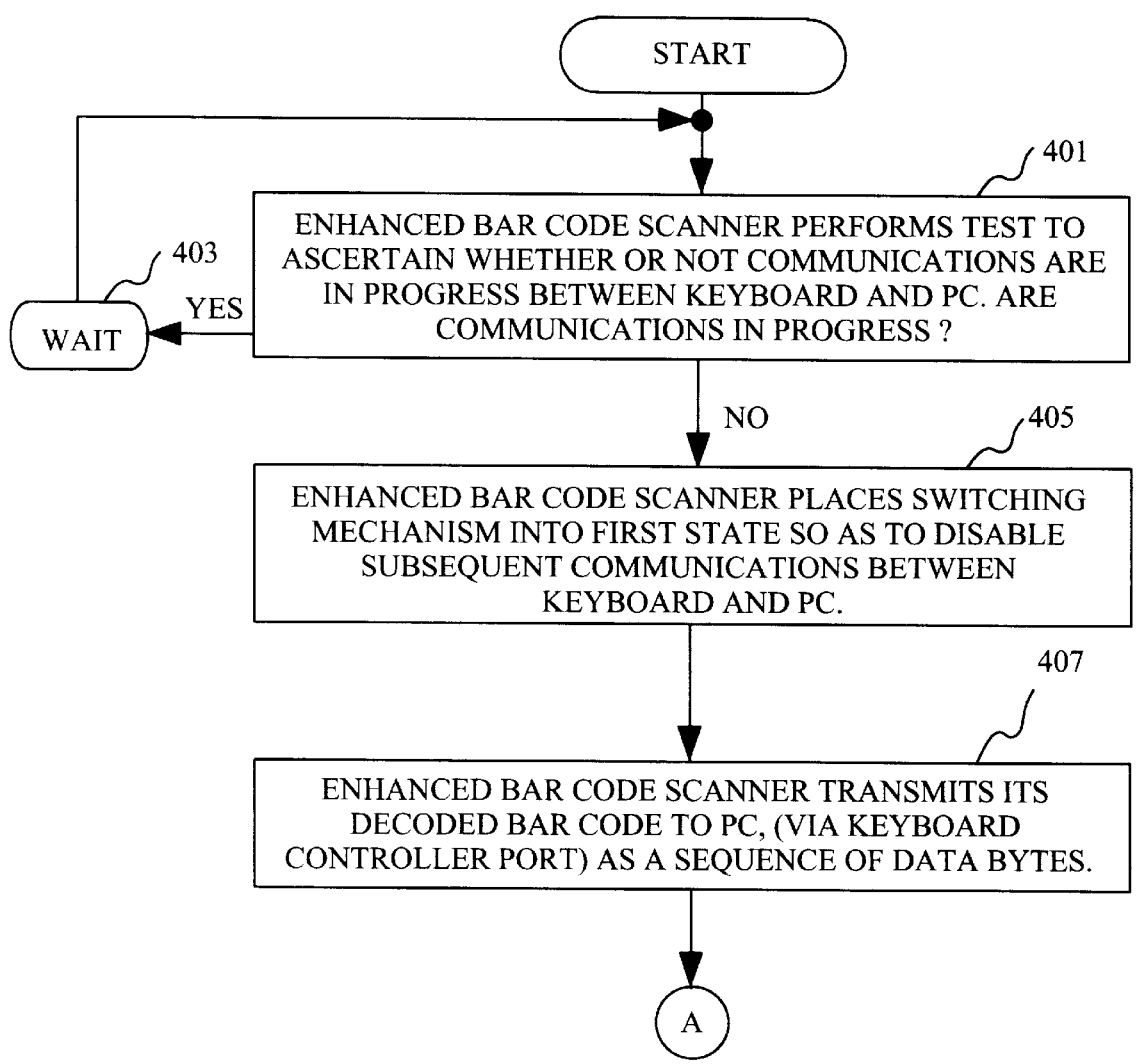
FIGS. 4A–4C together comprise a flowchart setting forth a message-based keyboard inhibit procedure according to a preferred embodiment of the invention.
Figure 4B:
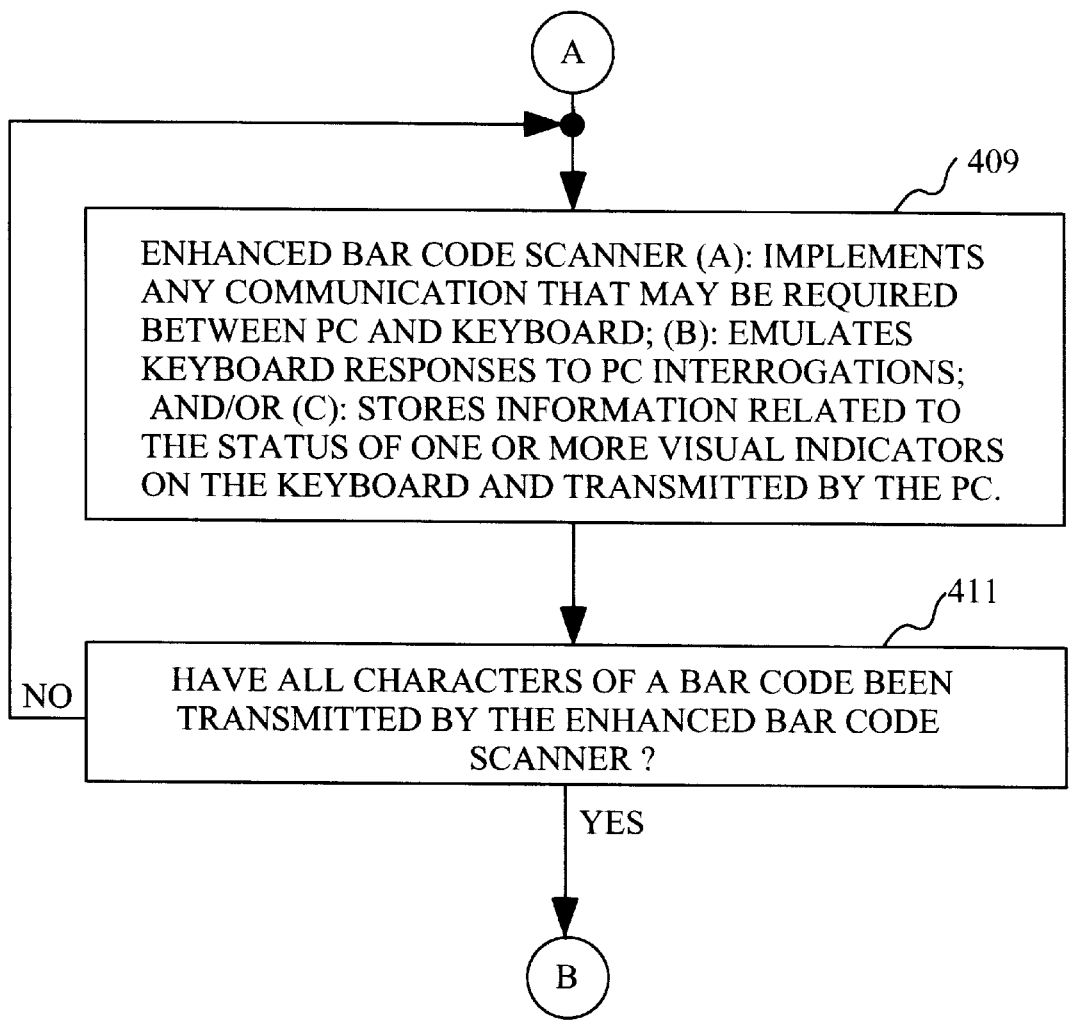
Figure 4C:
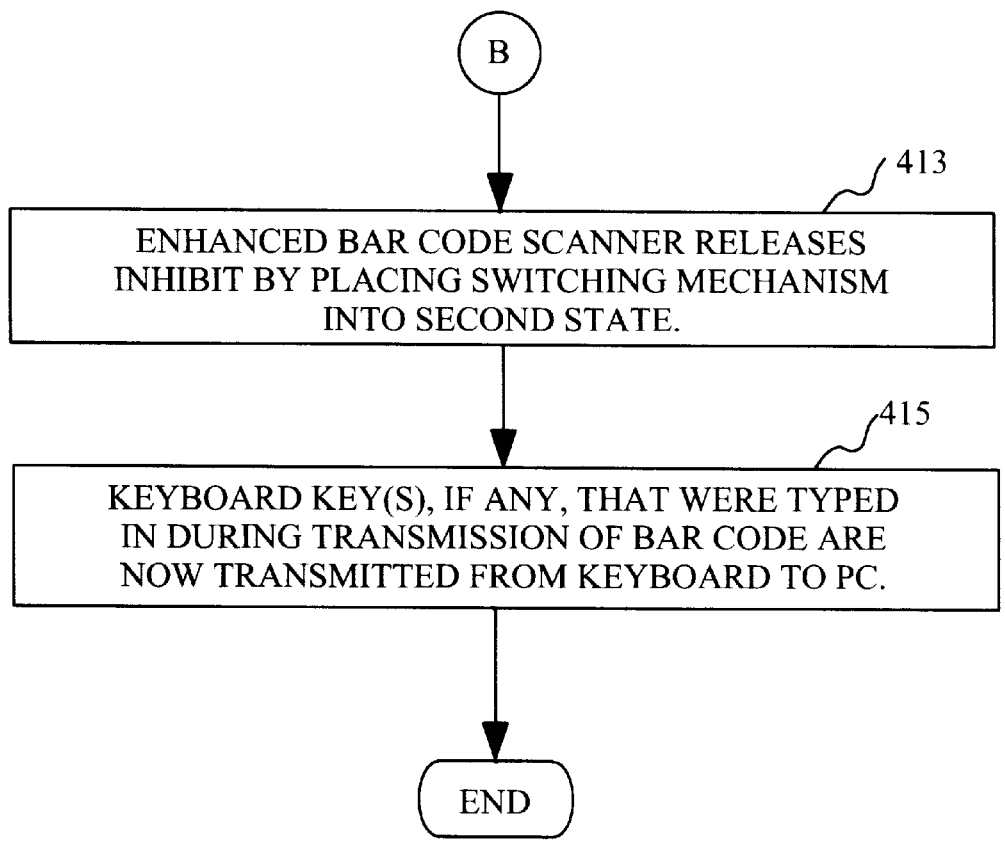

Refer now to FIGS. 4A–4C, which together comprise a flowchart setting forth a message-based keyboard inhibit procedure according to a preferred embodiment of the invention. The procedure commences at block 401 where the enhanced bar code scanner tests for any communication in progress between keyboard 210 and PC 200 (FIG. 2). If communications are in progress, the bar code scanner waits for a predetermined amount of time at block 403, and the program then loops back to block 401. If no communication is in progress, the negative branch from block 401 to block 405 is followed. The enhanced bar code scanner 208 (FIG. 2) places a switching mechanism (such as, for example, digital switch 205) into the first state so as to disable communications between keyboard 210 and keyboard controller port 204, thereby inhibiting the keyboard.

Next, at block 407, the enhanced bar code scanner 208 transmits the decoded bar code to the PC 200 as a sequence of data bytes. The enhanced bar code scanner 208 implements any communications that may be required between the PC and the keyboard during this time, emulates keyboard responses to PC interrogations; and/or stores information sent by the PC and related to the status of one or more visual indicators on the keyboard (block 409). This stored information is used to ascertain the actual status of these one or more visual indicators, such that the bar code scanner causes accurate visual indicator drive signals to be sent to the keyboard when the keyboard inhibit is released. These visual indicators may indicate the status of one or more keyboard 210 functions, such as caps-lock, num-lock, and scroll-lock. The inhibit will not be released (block 413) until all characters of the bar code have been transmitted by the scanner (block 411). Typically, three data bytes are used to represent each bar code character, and bar codes include a plurality of such characters. Once all characters of the bar code are transmitted, the enhanced bar code scanner releases the inhibit (block 413) by placing the switching mechanism (i.e., digital switch 205) into the second state. At this time (block 415), any keyboard key that was typed in during transmission of the bar code will now be transmitted from the keyboard 210 to the PC 200. Presently-existing keyboards have built-in buffers, and, therefore, such typed-in data will not be lost.

Message-based keyboard inhibit solves the problem of the keyboard and bar code scanner communicating on the same channel without interference. The invention can be provided by equipping the bar code scanner with software, firmware, and/or operating instructions. The user of the bar code scanner will be able to type-in data simultaneously with the scanner scanning and/or decoding bar code data. Both sets of data will remain intact throughout the typing and scanning interval.

Pursuant to a further embodiment of the invention, while the computer keyboard 210 is inhibited by digital switch 205, the enhanced bar code scanner 208 automatically detects the actual status of one or more indicators on computer keyboard 210. These indicators may be provided in the form of one or more LED lamps indicative of the status of the Caps-lock, Num-lock, and Scroll-lock keys. The procedure for automatically detecting LED indicator status is as follows. The enhanced bar code scanner is programmed to send to the PC data bytes representing two "num-lock" key toggles. The PC responds to each of the "num-lock" data bytes by sending keyboard LED status indicator drive signals to the keyboard controller port. The enhanced bar code scanner intercepts the drive signals for each occurrence of "num-lock" to thereby ascertain the actual status of the caps-lock key.

The enhanced bar code scanner 208 optionally keeps track of the transmission protocol currently in use, such as make-Break,Make-Only, AT or PS2-type scan-code transmission protocols. These status indications and transmission protocols may vary, depending upon the keyboard country type selected, and are maintained by the enhanced bar code scanner 208 until communications between keyboard 210 and PC 200 are resumed.

Pursuant to a still further embodiment of the invention, the enhanced bar code scanner 208 is equipped to detect a keyboard inhibit signal at the keyboard controller port 204. This inhibit signal may be generated by PC 200), and/or by any of a number of devices coupled to, and/or within this computing device. For example, the inhibit signal may be generated by the PC 200 pulling the clock line to a logic "low" state. In this example, the enhanced bar code scanner 208 would detect the existence of a keyboard inhibit signal by monitoring the clock line.

If the enhanced bar code scanner 208 detects a keyboard inhibit signal while a data byte is being transmitted to the keyboard controller port 204, the bar code scanner retransmits this data byte to the keyboard controller port 204. This retransmission process is repeated up to a specified number of times, so as to provide additional opportunities for the data byte to be inputted to the keyboard controller port 204 if the port is momentarily disabled by the keyboard inhibit signal. For many applications, it is advantageous to repeat the retransmission process up to three times for a given data byte. If the data byte is still not successfully received after the third attempt, the process is no longer repeated. This data byte may represent one or more scan codes which, in turn, represent one or more keyboard key presses or decoded bar codes. One purpose of this retransmission procedure is to accurately transmit a bar code on a transmission line that is subjected to possible halt or inhibit signals issued by PC 200. It should be noted that any number of sources contained within PC 200 could generate these inhibit signals. When a data byte is received at the keyboard port, this byte, which may represent all or part of a decoded bar code, is optionally displayed on a monitor coupled to PC 200.

Refer to FIGS. 3A–3K which together comprise a flowchart setting forth a message-based keyboard inhibit procedure implemented by a bar code scanner according to a preferred embodiment of the invention. In overview, the method is organized into a first sequence of steps related to power-up and diagnostics (blocks 301–304), a second sequence of steps related to the decoding and storing of data (blocks 305–306), a third sequence of steps related to keyboard output (blocks 307–308), a fourth sequence of steps related to ASCII to scan code conversion (blocks 309–311), a fifth sequence of steps related to preparation for a keyboard output sequence (blocks 312–317), a sixth sequence of steps related to first character keyboard initialization (blocks 318–322), a seventh sequence of steps related to keyboard scan code output (blocks 323–327), an eighth sequence of steps related to preparation for exiting the keyboard scan code transmission program (blocks 328–333), and a ninth sequence of steps related to a determination of whether or not there are more characters to transmit (blocks 334–335). It should be noted that the above-described organization of the steps into nine sequences is set forth for purposes of illustration and convenience. The steps may, but need not, be organized in the manner described above.

First Sequence of Steps
Power-up and Power on Diagnostics

Figure 1:
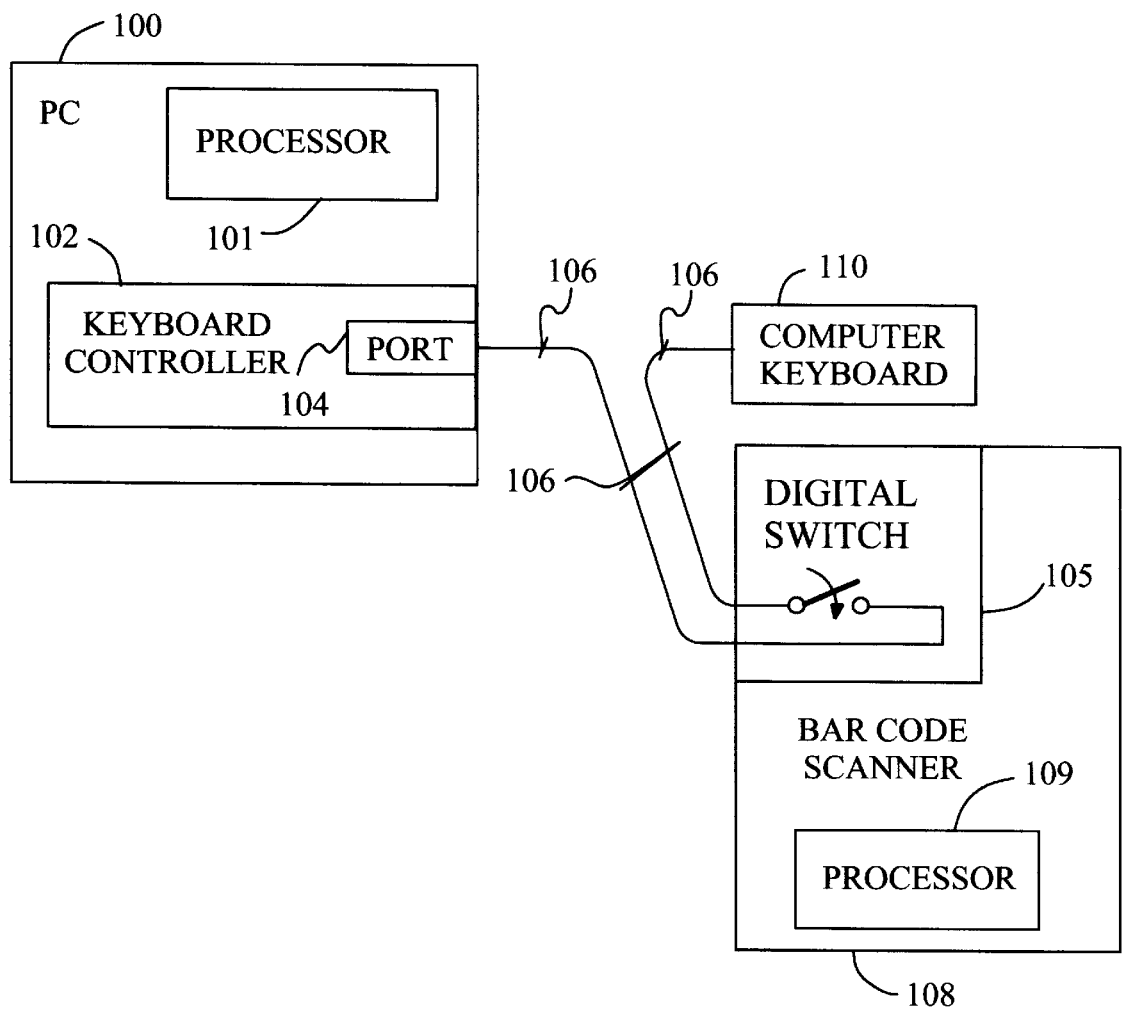
FIG. 1 is a hardware block diagram showing a prior art keyboard wedge bar code scanner configuration.

The program of FIGS. 3A–3K commences at block 301, where power is applied to enhanced bar code scanner (208, FIG. 2) and/or PC (200, FIG. 2) Next, at block 302 (FIG. 3), the program determines the operational mode of the enhanced bar code scanner. The operational mode is "normal" if the enhanced bar code scanner is to be used in a Y or wedge configuration with a computer keyboard, similar to the configuration of FIG. 1. The mode is "stand-alone" if, as shown in FIG. 2, the enhanced bar code scanner is a "stand alone" unit not to be used with a separate computer keyboard. If the operational mode is "normal", the program skips ahead to block 305. Otherwise, the program proceeds to block 303.

At block 303, it has already been determined that a separate computer keyboard (refer to FIG. 1) is not present. Accordingly, the enhanced bar code scanner (FIG. 2) must communicate to PC 200 all command bytes for successful completion of power-on diagnostics. The enhanced bar code scanner begins this keyboard emulation process by transmitting an "AA" to indicate that the "keyboard" self-test was completed successfully. After this point, the PC and "keyboard" (as emulated by the enhanced bar code scanner) may communicate and acknowledge any of a number of various commands to complete the power-on diagnostic sequence. Some PC's require more information than others for the power-on diagnostic procedure. Therefore the number of commands sent by the PC and acknowledged by the emulated keyboard is variable. These commands may include any of the following: Typamatic Rate, Make/Break status, scan code set enabled, and LED status.

At block 304, once the sequence of command bytes of block 303 are completed, the PC will power up normally. Note that powering up is sometimes referred to as "booting up". Without successful completion of these commands, the PC will fail to power up. After the PC boots up, the enhanced bar code scanner is ready to decode data.

Second Sequence of Steps
Decoding and Storing Data

At block 305, bar code symbols are decoded into human-readable and/or ASCII characters which are then stored in a memory device associated with the enhanced bar code scanner, such as, for example, random-access memory (RAM). At block 306, the program generates an appropriate output interface equipped to select output data from the enhanced bar code scanner.

Third Sequence of Steps
Begin Keyboard Output

A test is performed at block 307 to determine the output mode of the emulated keyboard. Typical output modes include AT, XT, and PS2. At block 308, the program determines the type of keyboard transmission that is to take place. Types of keyboard transmission include normal, ALT Mode, and special key transmission sequences.

Fourth Sequence of Steps
ASCII to Scan Code Conversation

At block 309, if the type of keyboard transmission (as determined at block 308) is normal transmission, the program proceeds to blocks 310 & 311. Otherwise, the program jumps ahead to block 312. The country output setting of the keyboard is determined at block 310. This country output setting specifies any of a plurality of keyboards, such as US (United States), UK (United Kingdom), FR (France), GR (Germany), BE (Belgium), SP (Spain), IT (Italy), and JP (Japan). Next, at block 311, an ASCII character of a bar code string received by the enhanced bar code scanner is converted to an equivalent scan code or keyboard key code for the particular keyboard type or country type determined at block 310.

Fifth Sequence of Steps
Prepare for Keyboard Output Sequence

The program proceeds (block 312) with the outputting of scan codes based on the keyboard type as previously determined at block 310. Then, at block 313, a test is performed to ascertain whether a "stand alone" (FIG. 2) or "normal keyboard wedge" configuration is in use. The "normal keyboard wedge" configuration is similar to FIG. 1, except that an enhanced bar code scanner is used in place of bar code scanner 108. At block 314, program control is routed to an appropriate operational sequence, depending upon the configuration in use as determined at block 313. If a "normal keyboard wedge" configuration is in use, the program proceeds with blocks 315, 316, and 317. Otherwise, the program jumps ahead to block 318.

At block 315, a test is performed to ascertain whether message-based inhibit or character inhibit has been selected. If message inhibit has been selected, then the program skips ahead to block 318. Otherwise, the program proceeds to block 316. A test is performed at block 316 to check for any PC to keyboard communications currently taking place. If there are any currently active communications taking place, the program waits until any such communication has ended. Then (block 317), the keyboard is inhibited from the PC.

Sixth Sequence of Steps
First Character Keyboard Initialization

This sequence commences by performing a test to determine whether or not a $1^{st}$ character of a scanner bar code transmission sequence has been sent by the enhanced bar code scanner (block 318). This scanner bar code transmission sequence is organized into a data byte, as previously described. If not, the program jumps ahead to block 323. Otherwise, the program proceeds to block 319, where a check is performed to determine whether or not normal keyboard transmission is required. If so, the program proceeds to block 320. If not, the program jumps ahead to block 323.

Next, a test is performed to determine if a European keyboard type (FR, GR, BE).is in use. If so, the program continues to block 321. If not, the program jumps ahead to block 323. At block 321, a [SHIFT] is transmitted and the PC releases the keyboard inhibit so as to place the keyboard into a known (lower-case) operational state. The PC then re-enables the keyboard inhibit (block 322).

Seventh Sequence of Steps
Keyboard Scan Code(s) are Outputted

At this point (block 323), if a normal keyboard wedge scanner configuration is in use, the scanner will communicate with other system components as if it was a stand-alone bar code scanner. All communications, if any, that are required will be acknowledged by the bar code scanner. Next (block 324), the output sequence is determined. The output sequence specifies any of Normal, Alt Mode, and Special Key transmission. All of these modes require the transmission of keyboard scan codes. Alt mode transmits the decimal value of the ASCII value using the numeric keypad scan codes. Special Key transmissions are the transmission of non-ASCII keys (i.e. function keys—F1, F2, etc., arrow keys and so forth). Normal key transmission is the transmission of normal ASCII characters that have an associated keyboard scan code. All scan codes may be transmitted using the aforementioned "3 strikes technique" to output the data.

The enhanced bar code scanner implements a keyboard scan code transmission (block 325) using a plurality of data bytes. A "MAKE" scan code followed by a 2 byte scan code BREAK sequence is transmitted. All 3 scan codes can use the "3 strikes" method. At block 326, each keyboard scan code transmission is an 11-bit output sequence. Its format is as follows: Start bit (0), 8 data bits (scan code), parity bit (odd parity) and a stop bit (1). While transmitting the bits, the PC can halt the transmission of the scan code by pulling the keyboard clock or data line low. Depending on the state of these lines, the keyboard may need to respond to the PC or wait until the lines go back to a ready-state and retransmit the scan code, up to a predetermined maximum number of times. This predetermined number is three in cases where the "3 strikes technique" is employed.

Once the MAKE-BREAK sequence is complete (block 327), then an intercharacter delay is implemented.

Eighth Sequence of Steps
Prepare to Exit keyboard Scan
Code Transmission Routine A test is again performed to ascertain whether a "stand alone" (FIG. 2) or "normal keyboard wedge" configuration is in use (block 328). If a Stand alone keyboard scanner is in use, the program jumps ahead to block 334. Otherwise, the program continues to block 329, where the program checks for a Message Inhibit and a Character Inhibit. If a Character Inhibit exists, this inhibit is released, and the program jumps ahead to block 334. If a Message Inhibit exists, the program advances to block 330, where a check is performed to determine whether or not this is the last character of the message. If it is the last character, the program advances to block 331 whereas, if it is not., the program advances to block 334.

At block 331, since this is the last character of the message, it is time to release the inhibit. It must also be determined if a scan code is to be transmitted that could have had an effect on the keyboard LED status. Check if any of the following scans codes are to be transmitted: Caps: Lock, Num Lock, Right or Left Shift. If not, continue at Block 334. Next (block 332), scan codes of Right or Left Shift only have keyboard LED status indicator implications with European keyboards. Accordingly, a check is performed to determine whether or not a FR, GR, or BE keyboard is in use. If any of these keyboards is in use, transmit the Shift scan code and allow the keyboard and PC to communicate; otherwise continue to block 333. If a scan code of Num Lock or Caps Lock is to be transmitted, transmit the appropriate scan code and allow the keyboard and PC to communicate, but correct the keyboard LED status indicators.

Ninth Sequence of steps
Determine Last Character to be Transmitted

Check if all characters have been transmitted (block 334). If not, the next ASCII character is obtained, the corresponding scan code is transmitted, and the program loops back to block 307. At block 335, the keyboard scan code output has been completed.

The program of FIGS. 3A–3K has been organized into nine operational sequences for illustrative purposes and as an explanatory aid. Those skilled in the art can appreciate that the program need not necessarily be organized into nine operational sequences, as variations thereto are still within the spirit and scope of the invention.

As stated above, the keyboard emulation mechanism may include software, firmware, and/or operating instructions. Use of this term herein is not necessarily indicative of any hardware enhancements to the bar code scanner. If the scanner is programmed to allow for up to three retransmissions, such a method is referred to as the "3-strikes-technique". A conventional transmission of one pressed key consists of three (3) characters—a make scan code and two (2) break code characters. Therefore, this technique could possibly transmit up to 9 characters to complete the key sequence. This retransmit technique gives the enhanced bar code scanner a limited number of retries per scan code, thus allowing a transmission sequence to move forward instead of hanging or sticking while trying to retransmit the same character over and over again.

But why should there ever be a need to retransmit a scan code? The retransmit protocol was developed after noticing that other devices or software within the PC could also inhibit the keyboard controller port. Some devices/software such as network drivers may inhibit the keyboard controller port every few milliseconds to perform some function without interrupt. Other devices, such as a mouse, may be on the same interrupt as the keyboard controller port, thus requiring the keyboard controller port to be inhibited while the software governing the mouse moves the mouse cursor. With laptops, the same types of inhibit issues can exist. However, even more restraints may be placed on the external keyboard controller port of a laptop than would be the case with a conventional PC. This renders use of the keyboard controller port as an auxiliary input channel all the more difficult in the operational environment of laptop computing.

With the advent of Windows 3.1 and Window 95, it appeared that more and more devices/software were effecting the behavior of the keyboard controller port. Therefore, it was imperative that a technique was developed that would transmit the scan code accurately, but take into account the fact that during transmission the keyboard could receive an inhibit and a retransmit would be necessary to accurately transmit the decoded bar code. The "3-strikes-technique" set forth herein accomplishes this task uniquely within a limited transmission sequence.

We claim:

1. A method for use with a bar code scanner that is adapted for connection to: (i) a keyboard controller port of a computing device, and (ii) a computer keyboard, in a keyboard-wedge configuration, the method preventing an intermingling of bar code data acquired by the bar code scanner and typed-in keyboard data typed into the keyboard by performing the steps of:

(a) the bar code scanner testing for the existence of any communication in progress between the keyboard and the computing device;

(b) if no such communication is in progress, the bar code scanner causing a switching mechanism to enter a first state so as to disable communications between the computer keyboard and the keyboard controller port, thereby inhibiting the keyboard;

(c) the bar code scanner transmitting a decoded bar code to the keyboard controller port as a sequence of data bytes, and/or emulating any communications that may be required between the keyboard controller port and the keyboard;

(d) once the bar code scanner has transmitted all characters of the bar code to the keyboard controller port, the bar code scanner releasing the keyboard inhibit by causing the switching mechanism to enter a second state, so as to permit communications between the keyboard and the keyboard controller port.

2. The method of claim 1 wherein step (d) further includes the step of the keyboard transmitting to the keyboard controller port any keyboard key that was typed in during transmission of the bar code in step (c).

3. The method of claim 1 wherein the first state of the switching mechanism inhibits the keyboard by placing a keyboard clock line into a logic "low" state, and allowing a keyboard data line to float to a logic "high" state.

4. The method of claim 3 wherein the second state of the switching mechanism permits communication between the keyboard and the PC by allowing logic "high" pulses on the keyboard clock line.

5. The method of claim 1 wherein the computing device is a PC (personal computer) or a laptop computer.

6. The method of claim 1 wherein the bar code scanner performs steps (a)–(d) using software, firmware, and/or operating instructions.

7. The method of claim 1 further including the steps of: a user of the bar code scanner typing on the keyboard substantially simultaneously with the user scanning and/or decoding bar code data; and the keyboard data remaining separate from the bar code data while the typing, scanning, and/or decoding is being performed.

8. The method of claim 1 for use with a computer keyboard having one or more visual indicators indicating a status of a corresponding keyboard function including at least one of capital lock (caps-lock), numeric lock (num-lock), and scroll lock (scroll-lock), wherein the corresponding keyboard function has an enabled status and a disabled status, the method further including the step of:

the bar code scanner keeping track of the status of the one or more visual indicators while communications between the computer keyboard and the keyboard controller port is disabled in step (b).

9. The method of claim 8 further including the step of the bar code scanner automatically determining the status of the corresponding keyboard function by transmitting bytes representative of a first and a second emulated num-lock key press to the keyboard and monitoring keyboard responses to each of the first and second emulated num-lock key presses to thereby determine the status of the corresponding keyboard function.

10. The method of claim 8 further including the step of the bar code scanner keeping track of a scan code transmission protocol currently in use, wherein the scan code transmission protocol includes at least one of Make-Break, Make-Only, AT, and PS2.

11. The method of claim 8 further including the steps of:

the bar code scanner interrogating the keyboard; and the keyboard, in response to the interrogating, transmitting to the keyboard an indicia of a keyboard country type uniquely identifying a country with which the keyboard is associated.

12. A bar code scanner adapted for connection to: (i) a keyboard controller port of a computing device, and (ii) a computer keyboard, in a keyboard-wedge configuration, the bar code scanner having a keyboard inhibit mechanism for preventing an intermingling of bar code data acquired by the bar code scanner and typed-in keyboard data typed into the keyboard; the keyboard inhibit mechanism comprising:

(a) a monitoring mechanism adapted to test for the existence of any communication in progress between the keyboard and the computing device;

(b) a switching mechanism, coupled to the monitoring mechanism, wherein, in response to an absence of communication in progress between the keyboard and the computing device, the switching mechanism enters a first state so as to disable subsequent communications between the computer keyboard and the keyboard controller port, thereby inhibiting the keyboard;

(c) a bar code transmission mechanism, responsive to the switching mechanism being in the first state, for transmitting a decoded bar code to the keyboard controller port as a sequence of data bytes, and/or for emulating any communications that may be required between the keyboard controller port and the keyboard;

wherein the switching mechanism is responsive to the code transmission mechanism such that, once the bar code transmission mechanism has transmitted all characters of the bar code to the keyboard controller port, the switching mechanism enters a second state so as to release the keyboard inhibit and to permit communications between the keyboard and the keyboard controller port.

13. The bar code scanner of claim 12 wherein the keyboard includes a buffering mechanism such that the keyboard is adapted to transmit to the keyboard controller port one or more keyboard keys that were typed in during transmission of the bar code to the keyboard controller port.

14. The bar code scanner of claim 12 wherein the first state of the switching mechanism inhibits the keyboard by placing a keyboard clock line into a logic "low" state, and allowing a keyboard data line to float to a logic "high" state;

and wherein the second state of the switching mechanism permits communication between the keyboard and the PC by allowing logic "high" pulses on the keyboard clock line.

15. The bar code scanner of claim 12 wherein the computing device is a PC (personal computer) or a laptop computer.

16. The bar code scanner of claim 12 wherein the monitoring mechanism, switching mechanism, and bar code transmission mechanism are implemented using software, firmware, and/or operating instructions.

17. The bar code scanner of claim 12 wherein, in response to a user of the bar code scanner typing on the keyboard substantially simultaneously with the user scanning and/or decoding bar code data, the keyboard data remains separate from the bar code data while the typing, scanning, and/or decoding is being performed.

18. The bar code scanner of claim 12 for use with a computer keyboard having one or more visual indicators indicating a status of a corresponding keyboard function including at least one of capital lock (caps-lock), numeric lock (num-lock), and scroll lock (scroll-lock), wherein the corresponding keyboard function has an enabled status and a disabled status, the bar code scanner further including an automatic detection mechanism for keeping track of the status of the one or more visual indicators while communications between the computer keyboard and the keyboard controller port is disabled.

19. The bar code scanner of claim 18 wherein the automatic detection mechanism automatically determines the status of the corresponding keyboard function by transmitting bytes representative of a first and a second emulated num-lock key press to the keyboard and monitoring keyboard responses to each of the first and second emulated num-lock key presses to thereby determine the status of the corresponding keyboard function.

20. The bar code scanner of claim 18 further including a protocol detection mechanism by which the bar code scanner keeps track of a scan code transmission protocol currently in use, the scan code transmission protocol including at least one of Make-Break, Make-Only, AT, and PS2.

* * * * *